Aug. 28, 1928.
H. McCORNACK
1,682,392
PULSATOR FOR MILKING MACHINES
Filed Aug. 12, 1920 5 Sheets-Sheet 1
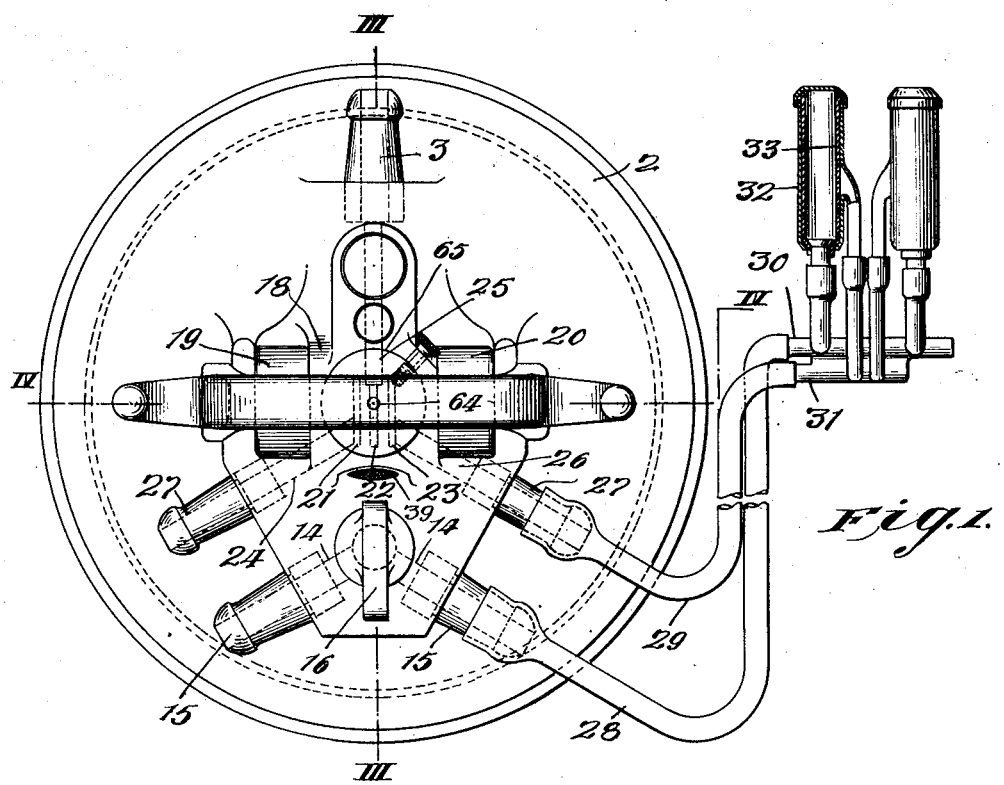
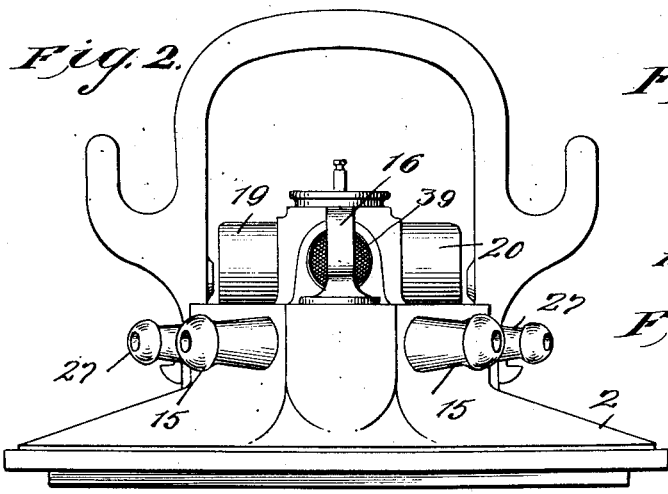
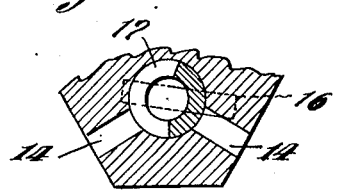
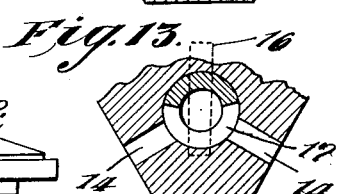
Herbert McCornack INVENTOR
BY Moses, Hammond & Middleton ATTORNEYS Aug. 28, 1928.
H. McCORNACK
1,682,392
PULSATOR FOR MILKING MACHINES
Filed Aug. 12, 1920     5 Sheets-Sheet 2
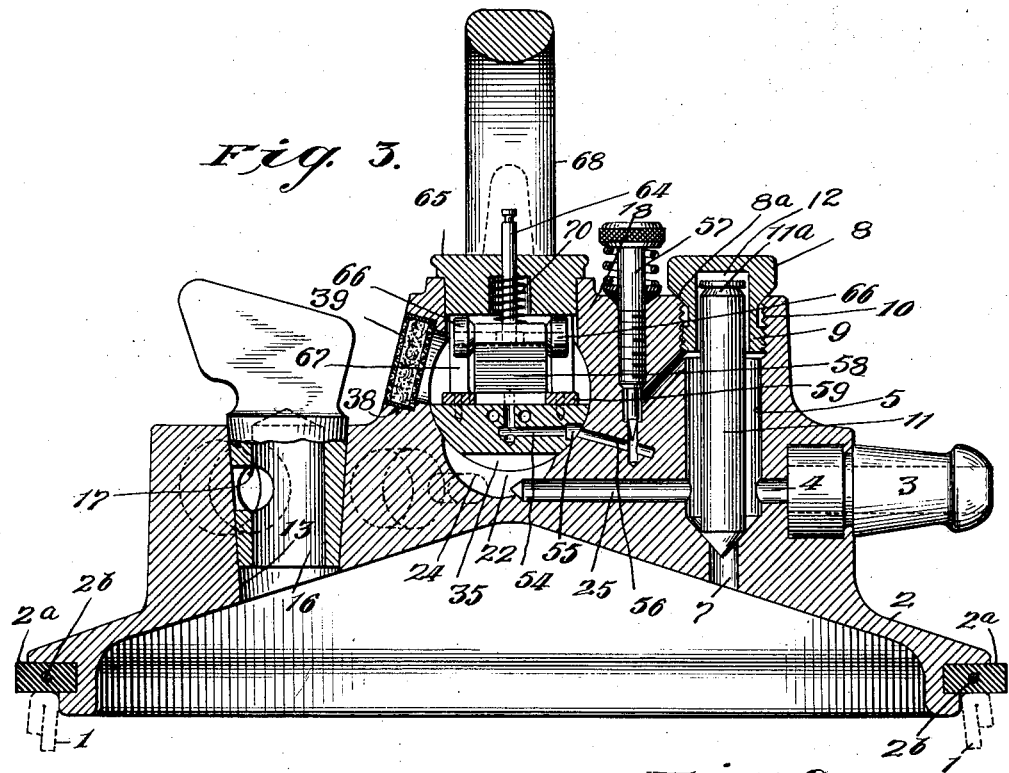
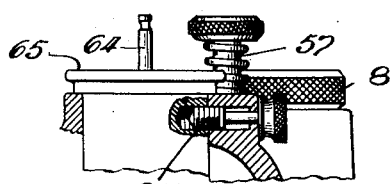
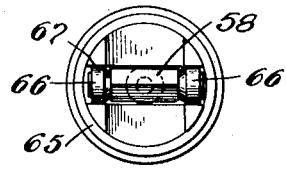
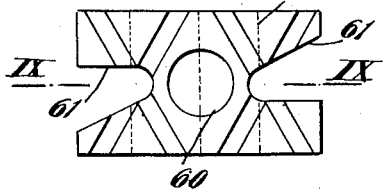
INVENTOR
Herbert McCornack
BY
Moses, Hammond & Middleton
ATTORNEYS Aug. 28, 1928.
H. McCORNACK
1,682,392
PULSATOR FOR MILKING MACHINES
Filed Aug. 12, 1920
5 Sheets-Sheet 3
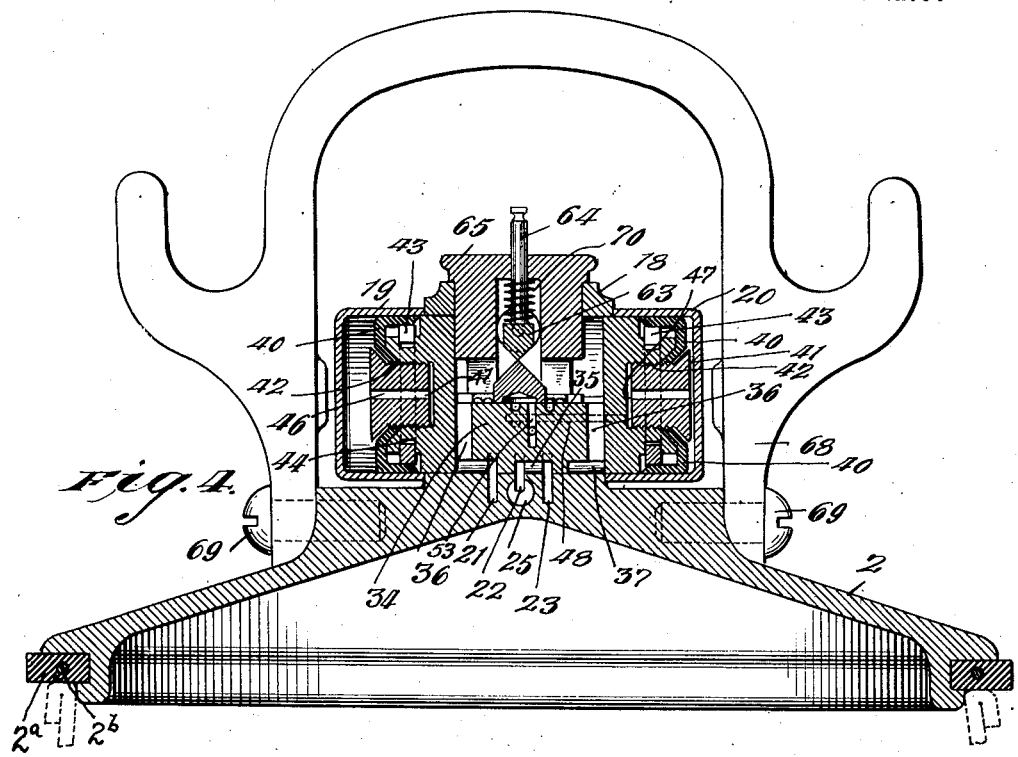
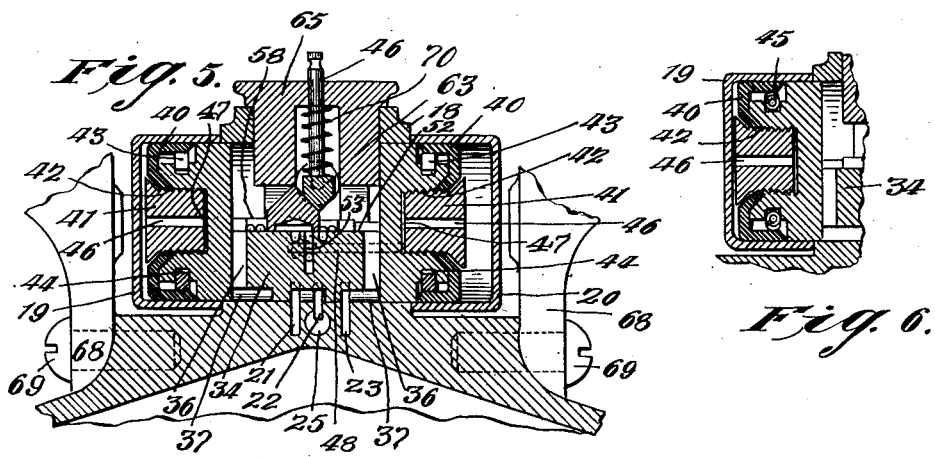 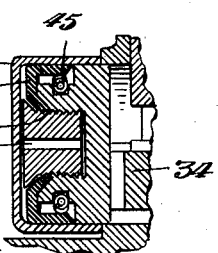
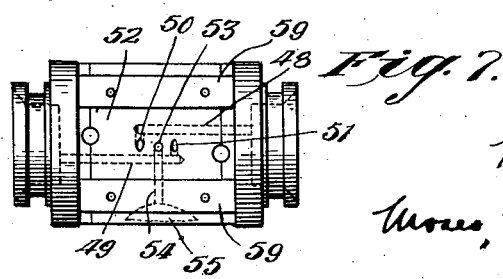
INVENTOR
Herbert McCornack
BY
Moses, Hammond & Middleton
ATTORNEYS Aug. 28, 1928.

H. McCORNACK 1,682,392

PULSATOR FOR MILKING MACHINES

Filed Aug. 12, 1920 5 Sheets-Sheet 4

INVENTOR
Herbert McCornack
BY
Moses, Hammond & Middleton
ATTORNEYS

Patented Aug. 28, 1928.

1,682,392

UNITED STATES PATENT OFFICE.

HERBERT McCORNACK, OF GLEN RIDGE, NEW JERSEY.

PULSATOR FOR MILKING MACHINES.

Application filed August 12, 1920. Serial No. 403,013.

This invention relates to improvements in milking machines and more particularly to pulsators therefor of the type which operate to alternately cut off and supply vacuum or pressure to the teat cups of milking apparatus.

The general purpose of the invention is to provide pulsator mechanism which is positive and efficient in its operation, and which is simple in its construction and in the manufacture and assemblage of its several parts. It is also a purpose of the invention to so construct the apparatus that the several parts thereof may be removed quickly and readily when it is desired to have access thereto for any reason, as for example, for cleaning or repairing. Further, the invention has for its object to provide an apparatus of this type which is durable in use, and in which leakage from wear is prevented.

In the accompanying drawings, forming a part of this specification:—

Figure 1 is a plan view of a receptacle cover having mounted thereon pulsator mechanism constructed according to and embodying my invention, one set of teat cups being shown connected thereto;

Figure 2 is a front elevation thereof;

Figure 3 is a sectional view taken on the line III—III of Figure 1;

Figure 4 is a sectional view taken on the line IV—IV of Figure 1;

Figure 5 is a view similar to Figure 4 but showing the parts of the mechanism as occupying different positions;

Figure 6 is a detail sectional view showing a slightly modified construction;

Figure 7 is a plan view of the piston;

Figure 8 is a bottom view of the reversing valve;

Figure 9 is a sectional view taken on the line IX—IX of Figure 8;

Figure 10 is a bottom view of the valve actuating plunger and its associated parts;

Figure 11 is a detail view of a portion of the mechanism;

Figures 12 and 13 are detail sectional views illustrating two different positions of the milk cock.

Figure 14:
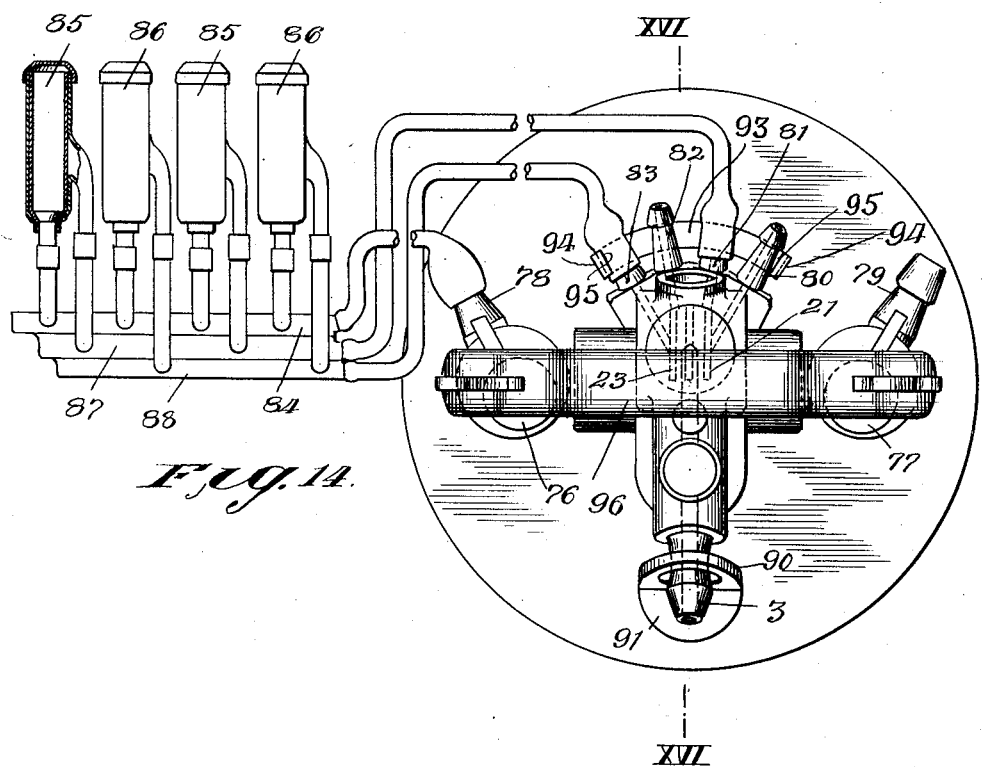
Figure 14 is a plan view showing a slightly modified construction.

Referring to Figures 1 to 13 of the drawings, the milk receptacle comprises a pail 1 and a cover or lid 2, provided with a rubber gasket 2$^a$ within which is embedded a wire 2$^b$ which prevents the gasket from stretching or being stripped off. Mounted upon the cover is a nipple 3 adapted to be connected by tubing or piping to a source of vacuum. At its inner end the nipple 3 communicates with a port 4, which in turn, communicates with a chamber 5 provided at its lower end with a suction port 7 leading to the interior of the milk pail 1. The upper end of the chamber 5 is closed by a cap 8, having a threaded portion 9 engaging a threaded opening 10 formed in the cover 2. In order to provide a fluid-tight joint, the cap is provided with a beveled surface 8$^a$ which engages a correspondingly shaped seat formed on the cover 2 when the cap is in position. Within the chamber 5 is a vertically movable check valve 11, the lower end of which, when the valve is in its normally lowered position, closes the port 7. The upper end of the check valve 11 extends freely within a recess 12 formed in the cap 8, whereby the suction within the chamber 5, during the milking operation, will cause the check valve 11 to be raised to open the port 7, thus placing the interior of the pail 1 in communication with the vacuum. At its upper end the check valve 11 is provided with an annular groove 11$^a$ to permit it to be gripped by the fingers when it is desired to lift the valve from the chamber 5. Formed in the cover 2, and communicating with the interior of the pail 1, is a valve chamber 13 provided with ports 14, 14 communicating with nipples 15, 15. Within the valve chamber 13 is a rotatable hollow valve or milk cock 16 having a port 17 adapted to be moved into register with either one (Figure 12) or both (Figure 13) of the ports 14, 14, whereby the same will be placed in communication with the interior of the pail 1, or to be moved out of register with both of the ports to close the same.

The pulsator mechanism, which is mounted upon the cover 2, comprises a cylinder consisting of a central body portion 18, preferably formed integrally with the cover 2, and removable caps 19, 20, constituting the end portions of the cylinder. The caps 19, 20 which may be drawn in a press or otherwise formed, are normally held in position with their free edges engaging the end walls of the body portion 18 of the cylinder, in a manner hereinafter described. The lower surface of the body portion 18 of the cylinder constitutes a valve seat provided with ports 21, 22 and 23 communicating respectively with passages 24, 25 and 26 formed in the cover 2. (See Figures 1, 3 and 4.) The passage 25 leads to the chamber 5, which is adapted to be connected to the vacuum source as already described, and the passages 24 and 26 to nipples 27, 27. (Figure 1.) The nipples 15 and 27, of each set of nipples, are adapted to be connected by flexible pipes 28, 29 to the two manifolds 30, 31 of a claw and set of teat cups. As shown, the teat cups are of the double chamber type, having a rigid outer casing 32, and an inner flexible lining or inflation 33. The inflations are in communication with the manifolds 30, while the space between the outer casing and the inflation of each of the teat cups is in communication with the manifold 31. When the apparatus is in use, there will be a continuous suction from the milk pail 1, through the port 14, nipple 15, pipe 28 and manifold 30, to the interiors of the inflations 33, and this vacuum will draw the milk from the cow and carry it to the milk pail 1. The vacuum within the spaces between the outer casings and the inflations will be pulsated by the pulsator valve mechanism, hereinafter described, in such a manner that atmospheric pressure will be admitted to such spaces alternately with the application of vacuum thereto. This alteration of atmospheric pressure and vacuum causes the teat cup lining to alternately extend, so as to permit the milk to flow, and to collapse upon the teat so as to support and relieve the same thereby preventing congestion in the teat and permitting the milking operation to be carried on in a normal manner.

It will of course be understood that the particular form of teat cup constitutes no part of the present invention and that any suitable type of cup may be used in connection with the pulsator herein described.

Mounted to reciprocate within the cylinder 18, 19, 20, is a piston 34 having a centrally disposed recess 35 formed in its under surface and constituting a valve to connect the suction port 22 alternately with the ports 21 and 23, as the piston reciprocates. The upper, central portion of the piston is cut away, as shown, and passages 36, 36 are provided, which extend through the reduced body portion of the piston, communicating at their upper ends with the interior of the cylinder and at their lower end with recesses 37, 37 formed in the under surface of the piston at either side of the recess 35. As the piston is moved to cause the valve 35 to connect the suction port 22 with either one of the ports 21 and 23, the other one of these ports will be opened to atmospheric pressure through a recess 37, passage 36, the interior of the cylinder, and an opening 38 formed in the wall of the cylinder, which is preferably provided with an air-filter 39 of any suitable construction for the purpose of preventing dust or any foreign matter from entering the pulsator mechanism and causing damage or wear of the moving parts thereof. One form of filter for such purpose is shown in Figure 3 as comprising a tubular body portion filled with a suitable filtering material, such as mineral wool, which is retained in position by wire netting or the like, secured to the body portion at the ends thereof.

The piston 34 is provided at each end with a leather cup washer 40 held in position by a screw 41 which engages a threaded recess 42 formed in the end of the piston. The ends of the piston are reduced slightly to permit the flanges of the leather cups 40 to be received between the piston and the walls of the cylinder and the flanges are constantly pressed outwardly against the cylinder walls, to form a tight joint therewith, by resilient tension rings 43 preferably formed of cork or cork composition and mounted within annular grooves 44 formed in the reduced ends of the piston. The cork rings 43 do not engage the inner surface of the grooves 44 and are free to float laterally in all directions to a limited extent, thus maintaining an even pressure upon the flanges of the cups at all points thereof. The rings 43 are split transversely to enable them to be positioned within the grooves 44, and when so positioned the ends of the rings abut, thus forming, in effect, a solid ring. In place of the cork rings 43, coiled springs 45 may be utilized, if desired, to exert the required pressure upon the cup flanges, as shown in Figure 6.

The screws 41 have longitudinal passages 46, extending therethrough, which communicate with the ends of the cylinder and with spaces 47 formed within the piston between the inner ends of the screws 41 and the inner walls of the recesses 42. The spaces 47 are in turn connected by passages 48, 49 (Figure 7) with ports 50, 51 formed in the plane surface 52 at the central cut away portion of the piston. Intermediate the ports 50 and 51, the plane surface or valve seat 52 is provided with a third port 53, from which a passage 54 leads to an elongated opening 55 formed in the surface of the piston and registering, at all positions of the piston, with the end of a passage 56 formed in the cover 2 and communicating with the chamber 5, (see Figure 3). The flow of air through the passage 56 is controlled by a regulating valve 57 adjustably mounted in an opening in the cover 2.

The plane surface 52 of the piston 34 constitutes a valve seat for a reversing valve 58 which is reciprocatingly mounted thereon between guides 59, 59. The valve 58, (Figures 8 and 9) is provided in its under surface with a centrally positioned recess 60 adapted, as the valve is actuated, to connect the port 53 alternately with one of the ports 50 and 51, whereby first one and then the other of these ports will be placed in communication with the vacuum. When either one of the ports 50 and 51 is in communication with the port 53, the other one thereof will be opened to atmospheric pressure as it will be in register with one or the other of the recesses 61 formed in the ends of the valve 58. It will thus be seen that at the end positions of the valve 58, one end of the cylinder will have the pressure therein reduced by its communication with the source of vacuum and the other end thereof will be opened to atmospheric pressure, as a result of which the piston will be caused to travel within the cylinder. Upon the shifting of the reversing valve 58 to its other position, the pressure conditions will be reversed and the piston will be caused to travel in the opposite direction. At each reciprocation of the piston 34, the cap at the end of the cylinder toward which the piston is traveling will be held firmly seated against the central portion of the cylinder by the suction to which that end of the cylinder is subjected, and the cap at the opposite end of the cylinder will be held in position by the drag caused by the friction between the cup leather 40 and the inner wall of the cup. When the apparatus is not being operated, both caps will be retained in position by reason of the friction between their walls and the cup leathers of the piston.

During the operation of the piston the valve at the under side thereof is kept pressed firmly upon its seat by the weight of the piston, and also by the atmospheric pressure acting on the upper side thereof and the suction to which the recess 35 of the valve on the underside thereof is subjected, thereby preventing any leakage between the moving parts. Owing to the fact that the caps 19, 20 at the ends of the cylinder are movable with respect to the body portion 18 thereof, they will be carried down by the piston, as the latter, and the valve seat upon which it moves, wear and will always remain concentric with the piston. As the piston is constantly pressed downwardly, as above set forth, and as the ports controlled thereby are below the axis of the cylinder, the piston will be pressed firmly upon the valve seat, as the co-acting parts wear, thus preventing any leakage therebetween.

The length of the reversing valve 58 is less than the length of the cut away portion of the piston 34 in order to permit movement of the valve relatively to its seat, whereby it may be shifted a sufficient distance to effect the alternate connecting of the ports 50 and 51 with the port 53, as above described. At its center, the valve 58 is provided with an upwardly extending wedge-shaped portion 62 (Figures 4, 5 and 9), with which co-acts the wedge-shaped head 63 of a spring pressed plunger 64 or valve shipper reciprocatingly mounted within a plug 65 which fits in an opening in the top of the central body portion 18 of the cylinder, and is removably held in place by suitable means such as the set screw 65ª, (Figure 11). At either end of the head 63, the plunger is provided with rollers 66 which engage guideways 67 formed in the plug 65 and serve to maintain the head 63 properly positioned with respect to the wedge-shaped portion 62 of the valve 58. The plunger 64 serves to shift the reversing valve 58 from one of its operative positions to the other thereof, and to prevent such shifting movement from being made prematurely. When the valve 58 is in one of its operative positions, as shown for example in Figure 5, one end of the valve will be in engagement with the corresponding end wall of the cut away portion of the piston 34, the recess 60 will be in position to connect port 53 with one or the other of the ports 50 and 51, and the other one of these two ports will be subjected to atmospheric pressure through one of the recesses 61. The valve 58 will be securely held against movement upon its seat 52 by the plunger 64, the head 63 of which will be in engagement with the wedge shaped portion 62 of the valve. As the piston moves from left to right, as seen in Figure 5, the valve 58 will be moved therewith, but it will still be held in its operative position by the plunger 64, which will be forced gradually upwards by the co-action of the inclined faces of the wedge-shaped members. The valve 58 will remain in its position upon the valve seat 52 until it has been moved sufficiently to cause the edges of the wedge-shaped members to register, but the instant the edge of the wedge-shaped portion 62 of the valve 58 is carried past the edge of the wedge-shaped head 63 of the plunger 64, the latter will be forced downward by the spring 70 and the valve 58 will be instantly shifted upon its seat 52 to its other operative position in which the port which was in communication with the port 53 will now be exposed to atmospheric pressure, and the port which was formerly exposed to the atmosphere will now be in communication with the port 53.

The cover 2 is provided with a suitable handle 68 which is removably secured thereto by bolts 69, whereby the handle may be readily removed when it is desired to have access to the pulsator mechanism for any reason, such as cleaning or repairing. When the handle 68 is in position, the downwardly extending ends thereof serve to prevent the caps 19, 20, from being displaced.

In operation, assuming that the nipple 3 is connected to a source of vacuum, and that the set of nipples 15, 27 at the left in Figure 1, are connected to a set of teat cups in the same manner in which the set of nipples at the right are shown connected, the vacuum produced within the chamber 5 will cause the valve 11 to be lifted off of its seat, thereby subjecting the interior of the pail to vacuum. As the hollow valve 16 will be in position to effect communication between the inside of the pail and the nipples 15, of both sets of nipples, the inflations 33 of the teat cups to which the nipples 15 are connected by the tubing 28, will be constantly subjected to the vacuum and hence the milk will be drawn to the pail. Assuming the movable parts of the pulsator mechanism to be in the positions shown in Figure 5, the valve 35 at the under side of the piston 34 will be in position to place port 21 in communication with port 22, and port 23 will be uncovered. As port 22 communicates with the chamber 5 through the passage 25, the same will be subjected to the action of the vacuum, and consequently the spaces between the outer casings 32 and the inner linings 33 of the teat cups, which are connected to the nipple 27 of the left hand set of nipples, will be subjected to the vacuum. At the same time the corresponding outer chambers of the teat cups which are connected to the nipple 27 of the right hand set of nipples, will be subjected to atmospheric pressure as the port 23, to which the right hand nipple 27 is connected, is open to the atmosphere through recess 37, passage 36, upper portion of cylinder, and the opening 28 in the wall thereof.

With the several parts as shown, the reversing valve 58 will be in position to effect communication between ports 50 and 53, and the port 51 will be uncovered. As the port 50 is in communication with the right hand end of the cylinder by means of passage 48, space 47, and passage 46, and as the port 53 communicates through passages 54 and 56 with the chamber 5 which is under the influence of the vacuum, it is evident that the right hand end of the cylinder will be subjected to the vacuum while its opposite end is subjected to atmospheric pressure entering through the uncovered port 51, as a result of which, the piston 34 will move toward the right. As the piston travels in this direction the valve 35 will be moved to uncover port 21 and to connect port 22 with port 23, thus reversing the conditions within the spaces formed between the outer casings and the inflations of the two sets of teat cups, and causing atmospheric pressure to be applied with respect to the teat cups connected to the left hand set of nipples, while the teat cups connected to the right hand set of nipples will be subjected to the vacuum. It will thus be seen that the spaces between the casings and the inflations of the teat cups will be alternately subjected to vacuum and atmospheric pressure as the piston reciprocates, whereby the milking operation will be carried on in the manner above set forth. As the piston 34 moves from left to right the reversing valve 58 will be carried with it, but the valve will not shift its position with respect to the piston until the peak of its wedge-shaped portion has passed the peak of the wedge-shaped head 63 of the plunger 64, as above explained, and at this instant the valve 58 will be shifted quickly upon its seat to its other operative position, in which the ports 53 and 51 will be placed in communication with one another and the port 50 will be uncovered. With the parts in this position the left end of the cylinder will be subjected to vacuum and the right end will be subjected to the atmosphere, thereby causing the piston to move in the opposite direction until the reversing valve is again shifted upon its seat, and the above described operations repeated as long as the apparatus is being used.

The speed of travel of the piston 34 may be varied by means of the adjustable valve 57 which is adapted to vary the effective cross-section of the passage 56 extending between the passage 54 and the chamber 5.

From the above description it will be evident that I have provided a pulsator mechanism which possesses the following advantages. It is simple in its construction, positive in its operation and not liable to get out of order, and inexpensive to manufacture. Moreover, the apparatus is efficient and economical in operation, and is capable of being operated by unskilled persons by reason of the simplicity of the operation thereof. As the piston is maintained firmly upon its valve seat in the cylinder by its own weight and by the pressure of the atmosphere upon its upper portion, as above pointed out, and as the self-aligning ends of the cylinder move downward with the piston as wear occurs between it and the valve seat, there can be no leakage between these several parts. Furthermore, no leakage can occur between the reversing valve and its seat, as the valve is pressed upon its seat by its own weight, by atmospheric pressure and by the spring pressed plunger which controls its movement. It will thus be seen that all of the forces acting upon the piston and the reversing valve tend to maintain them on their respective seats irrespective of any wear which may take place. Furthermore, the several parts of the apparatus may be assembled with the minimum expenditure of time and of labor, thus lessening the cost of production. When it is necessary or desirable to repair or clean the apparatus, the several parts thereof may be removed quickly and readily in order to have access thereto, as it is merely necessary to remove the handle 68, the caps 19 and 20 and the plug 65, after which the piston 34 and the reversing valve 58 may be removed from the body portion 18 of the cylinder.

Figure 15:
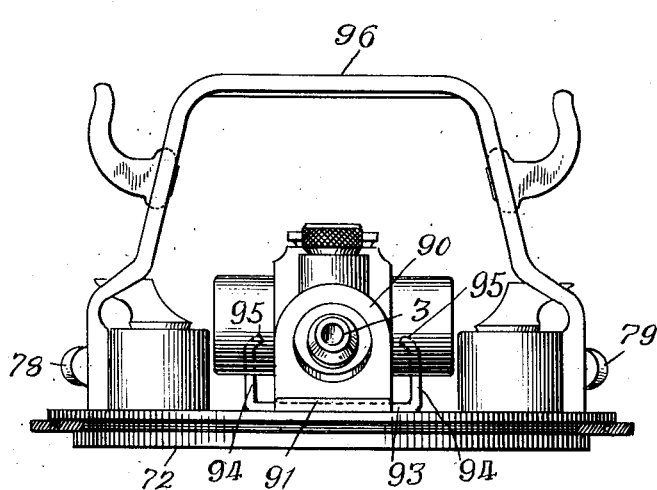
Figure 15 is a rear elevational view thereof.
Figure 16:
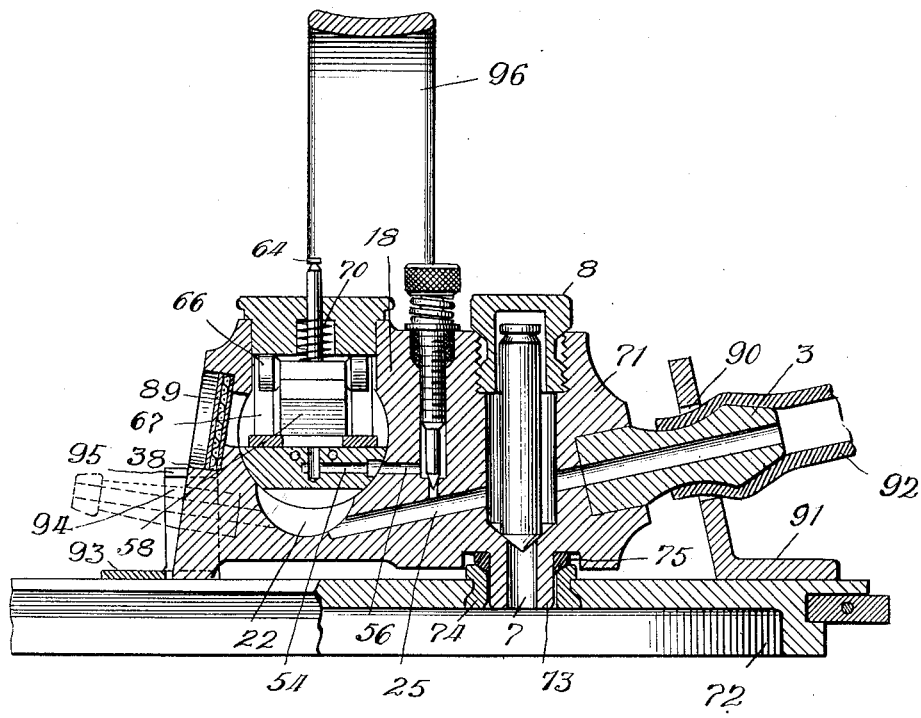
Figure 16 is a sectional view taken on the line XVI—XVI of Figure 14.

Referring to Figures 14, 15 and 16, the pulsator mechanism is shown as comprising a casting 71 removably supported upon the cover or lid 72 of the milk pail and normally maintained in position thereon by its weight, and when the apparatus is in use by the suction within the pail. This construction permits of the removal of the pulsator mechanism from the cover, whereby the latter may be more easily handled when it is desired to clean the same, and furthermore, it permits the cover to be immersed in the cleaning fluid without subjecting the pulsator thereto. The casting 71 is provided with a downwardly-extending projection 73 through which the port 7 extends, and which, when the casting is in position, extends through a bushing 74 secured to the cover 72. In order to form an air-tight joint between the casting and the cover a suitable packing 75 is interposed between the upper end of the bushing and the bottom of the casting. The upper end of the bushing and the lower surface of the packing are preferably beveled, as shown, whereby to form a more perfect air-tight joint between the parts. The removable end portions 19 and 20 of the cylinder 18 are prevented from being displaced by the casings of the milk cocks 76 and 77 which are preferably formed integral with the cover 72 and positioned adjacent the opposite ends of the pulsator cylinder. The milk cocks control the flow of milk through the milk nipples 78 and 79.

The pulsator mechanism which is of the same construction as that hereinabove described in connection with Figures 1 to 13, inclusive, is shown as being adapted to be used in connection with teat cup clusters of that type having four teat cups arranged in pairs to which pairs the suction is alternately applied. In order to adapt the apparatus to be used with teat cup clusters of this type the ports 21 and 23 are provided with branches which communicate, respectively, with a pair of nipples 80 and 81, and with a pair of nipples 82 and 83. The nipples 78, 81 and 83 are adapted to be connected to one teat cup cluster, and the nipples 79, 80 and 82 are adapted to be connected to another teat cup cluster. But one teat cup cluster is illustrated, and, as shown, the inflations of the teat cups communicate with the manifold 84 which is connected by flexible tubing to the nipple 78 of the milk cock 76, and the space between the outer casing and the inflation of the pairs of teat cups 85 and 86 are connected respectively to the manifolds 87 and 88, which in turn are connected by flexible tubing to the nipples 81 and 83. In operation the milk cock 76 controlling the nipple 78 is opened whereby the inflations of all of the teat cups are continuously subjected to the vacuum within the pail, and the pairs of teat cups 85 and 86 are alternately subjected to vacuum and atmospheric pressure in the usual manner. The nipples 79, 80 and 82 are similarly connected to another teat cup cluster, not shown. The opening 38 of the cylinder 18 is shown as being provided with an air filter 89 comprising wire netting or the like, faced on both sides by a suitable filtering fabric.

The outer end of the nipple 3, which is connected to the source of vacuum, extends through a circular opening 90 formed in an angular member 91 secured to the cover 72. The opening, which is concentric with the nipple, receives the end of the flexible tubing or hose 92 secured thereto and serves to assist in preventing accidental displacement of the casting 71 with respect to the cover 72. To further assist in preventing accidental displacement of the casting 71, a curved plate 93 is secured to the upper surface of the cover in position to lie below the nipples 80, 81, 82 and 83, when the casting is in place. The plate is provided at its end with upwardly extending portions 94 spaced laterally from the outer nipples 80 and 83 a sufficient distance to permit of the flexible tubing being attached thereto. At their upper ends the upstanding portions 94 are provided with inwardly extending portions 95 which will overlie the flexible tubing upon the nipples 80 and 83, but which will not overlie the nipples, whereby, when the flexible tubing is removed from the nipples, they will pass freely between the inwardly extending portions 95 when the casting 72 is raised from the cover. When the flexible tubing is secured to the nipples 80 and 83 the inwardly extending portions 95, which overlie the tubing at the outer side of the nipples, will prevent the casting from being raised, and the upstanding portions 94 will prevent lateral movement of the casting. The cover is provided with a handle 96 which is secured to the casings of the milk cocks 76 and 77.

To remove the pulsator mechanism it is merely necessary to detach the hose 92 from the nipple 3 and the flexible tubing from the nipples 80, 81, 82 and 83, and then to raise the casting 71 from the cover and carry it forwardly, the front portion of the mechanism being tilted upwardly slightly to permit the nipple 3 to be freely withdrawn from its position within the opening 90 in the angular member 91. After the pulsator mechanism has been removed, the cover 72, to which the milk cocks and the milk nipples are secured, may be easily and thoroughly cleaned in any suitable manner, as by immersing it within the cleaning liquid. The pulsator mechanism is placed in position upon the cover in the reverse manner hereinabove described in connection with its removal therefrom.

While I have illustrated and described in detail two preferred forms and applications of my invention, it will be understood that the invention may be modified in various ways and I do not therefore wish to be limited to the particular constructions shown, but intend to cover my invention broadly in whatever form its principles may be embodied.

Having thus described my invention, what I claim as new and desire to secure by Letters Patent is:—

1. In pulsator mechanism for milking apparatus, a cylinder, a piston mounted to reciprocate therein and having annular grooves formed in its outer surface adjacent its ends, washers carried by said piston adjacent the ends thereof and extending between said piston and the wall of said cylinder and in register with said grooves, and split rings of yielding material mounted within said grooves for holding said washers in engagement with said cylinder wall, said rings having their ends abutting and having internal diameters greater than the internal diameters of the grooves whereby to permit bodily movement of said rings with respect to said grooves.

2. In pulsator mechanism for milking apparatus, a cylinder, a vacuum operated piston mounted to reciprocate therein, a reversing valve carried by said piston and movable with respect thereto, said valve being provided with a wedge shaped projection, and a yielding member having a wedge shaped portion engaging the wedge shaped projection of said valve to control the movement of this valve and force it against its seat.

3. In pulsator mechanism for milking apparatus, a cylinder comprising a central portion and removable end portions, and a piston mounted to reciprocate within said cylinder and serving to hold said end portions in position.

4. In pulsator mechanism for milking apparatus, a cylinder comprising a central portion and removable end portions engaging the end walls of said central portion, and a piston mounted to reciprocate within said cylinder and serving to hold said end portions in place.

5. In pulsator mechanism for milking apparatus, a cylinder comprising a central portion and removable cap-shaped end portions having their inner ends engaging said central portion, and a piston mounted to reciprocate within said cylinder and serving to hold said end portions in place.

6. In pulsator mechanism for milking apparatus, a cylinder comprising a central portion and removable cap-shaped end portions having their inner ends abutting against the end walls of said central portion, and a piston mounted to reciprocate within said cylinder and serving to hold said end portions in place.

7. In pulsator mechanism for milking apparatus, a cylinder comprising a central portion and end portions, said central portion being provided with a valve seat having ports formed therein, and a piston mounted to reciprocate within said cylinder and provided with a valve coacting with said ports, said piston being held in pressing engagement with said valve seat, the end portions of said cylinder being bodily movable with respect to the central portion thereof, and being held in place by said piston, whereby they will move with said piston as the latter is moved to take up wear between the same and said valve seat.

8. In pulsator mechanism for milking apparatus, a cylinder comprising a central portion and end portions bodily movable with respect to said central portion and engaging the end walls thereof, said central portion having a valve seat in the lower portion thereof provided with ports, and a piston mounted to reciprocate within said cylinder and serving to hold the end portions thereof in place, said piston being provided in its lower portion with a valve coacting with said ports and being held in pressing engagement with said valve seat whereby as wear occurs between said valve seat and said piston the latter will be moved toward the valve seat and the end portions of said cylinder will move with said piston and remain concentric therewith.

9. In pulsator mechanism for milking apparatus, a cylinder, a vacuum operated piston mounted to reciprocate therein, a reversing valve carried by said piston and movable with respect thereto, and means adapted to maintain said valve in one of its operative positions during a predetermined portion of the travel of said piston and then to move said valve to occupy the other of its positions, said means serving to press said valve in engagement with said piston whereby leakage due to wear is prevented.

10. In pulsator mechanism for milking apparatus, a cylinder having an opening in its top, a vacuum operated piston mounted to reciprocate therein, a reversing valve carried by said piston and movable with respect thereto, a plug removably supported in the opening in said cylinder, and reciprocating means carried by said plug to control the movement of said valve.

11. In pulsator mechanism for milking apparatus, a cylinder having an opening in its top, a vacuum operated piston mounted to reciprocate therein, a reversing valve carried by said piston and movable with respect thereto, a plug removably supported in the opening in said cylinder and provided with guide ways, and means carried by said plug to control the movement of said valve, said means being provided with rollers engaging said guideways.

12. In pulsator mechanism for milking apparatus, a cylinder, a vacuum operated piston mounted to reciprocate therein, a reversing valve carried by said piston and movable with respect thereto, and means reciprocating in a line at right angles to the line of travel of said valve to control the movement thereof.

13. In apparatus of the character described, a milk receptacle having a duct adapted to be connected to a source of vacuum, a valve for opening and closing said duct, a chamber for said valve having an open end, the wall of said chamber adjacent its open end being beveled to form a seat, and a closure for said chamber having a beveled surface engaging said seat to form a fluid-tight joint therewith.

14. In apparatus of the character described, a milk receptacle having a duct adapted to be connected to a source of vacuum, a valve for opening and closing said duct, and a chamber within which said valve is mounted to reciprocate, the outer end of said valve being provided with a groove whereby it may be gripped by the fingers and withdrawn from said chamber.

15. In pulsator mechanism for milking apparatus, a cylinder including a fixed portion and a portion capable of lateral movement with respect thereto, and a piston mounted to reciprocate within said cylinder.

16. In pulsator mechanism for milking apparatus, a cylinder including a fixed portion and an adjustable portion, said fixed portion being provided with a valve seat, and a piston mounted to reciprocate within said cylinder and pressed against said valve seat, said piston engaging said adjustable portion of said cylinder, whereby as wear occurs between said piston and said valve seat said adjustable portion of said cylinder will be moved relatively to the fixed portion thereof by the movement of said piston towards said valve seat.

17. In pulsator mechanism for milking apparatus, a cylinder including a fixed portion and a self-aligning portion, and a piston mounted to reciprocate within said cylinder and engaging said portions thereof.

18. In apparatus of the kind described, a receptacle cover, pulsator mechanism removably supported thereon including nipples provided with circumferentially extending enlarged portions, retaining means carried by the cover and provided with apertures of sufficient diameter to permit passage therethrough of the enlarged portions of the nipples, and flexible tubing detachably connected to the nipples and surrounding the enlarged portions thereof, said tubing being normally small enough to pass freely through the apertures of the retaining means, but being expanded by the enlarged portions of the nipples sufficiently to prevent the withdrawal of the nipples and the surrounding tubing through the apertures.

19. In a milking machine pulsator, in combination, a pulsator body, a piston slidable thereon and a cylinder head supported by the piston and free to move with the piston in a direction transverse to the normal path of piston travel.

In testimony whereof I have affixed my signature to this specification.

HERBERT McCORNACK.